United States Patent [19]

D'Silva

[11] 4,160,854
[45] Jul. 10, 1979

[54] DUCTILE BRAZING FOIL FOR CAST SUPERALLOYS

[75] Inventor: Thomas L. D'Silva, Belmont, Calif.

[73] Assignee: Western Gold & Platinum Co., Belmont, Calif.

[21] Appl. No.: 925,907

[22] Filed: Jul. 19, 1978

[51] Int. Cl.$^2$ .............................................. F16B 5/08
[52] U.S. Cl. ............................... 428/607; 148/31.5; 428/366; 428/627; 428/378
[58] Field of Search ............... 428/366, 379, 389, 606, 428/607, 627; 75/123 J, 123 M, 124, 170, 171, 176; 148/31.5, 32

[56] References Cited

U.S. PATENT DOCUMENTS

| | | | |
|---|---|---|---|
| 3,753,794 | 8/1973 | Paulon et al. | 148/32 |
| 4,052,201 | 10/1977 | Polk et al. | 75/170 |
| 4,056,411 | 11/1977 | Chen et al. | 75/170 |
| 4,059,441 | 11/1977 | Roy et al. | 75/174 |
| 4,067,732 | 1/1978 | Roy | 75/170 |
| 4,116,682 | 9/1978 | Polk et al. | 75/170 |

FOREIGN PATENT DOCUMENTS 1237411 3/1967 Fed. Rep. of Germany ........... 428/378

Primary Examiner—L. Dewayne Rutledge
Assistant Examiner—Michael L. Lewis
Attorney, Agent, or Firm—Donald R. Castle

[57] ABSTRACT

Cast superalloys of the formula $P_x Q_y R_z$ wherein P is an element selected from the group consisting of Fe, Ni, Cr, Co or mixtures thereof, wherein Q is a refractory element selected from the group consisting of Mo, W, Ta or a mixture thereof wherein R is a reactive element selected from the group consisting of Al, Ti, Cb or mixtures thereof, x is from about 65 to about 95 atomic percent, y is from about 1 to about 10 atomic percent, z is from about 1 to about 18 atomic percent and $x+y+z$ is equal to about 100 in the form of thin foil are made ductile by the presence of appreciable amounts of amorphous phase and micro-crystalline, metastable single phase and subsequently boron is deposited as nickel, iron or cobalt boride on the surface of the foil at a temperature below the crystallization temperature of the superalloy. Such foil is especially suited for preplacement in a joining operation such as brazing.

3 Claims, No Drawings ary, etc. alloys. Specific examples are given to a Pd$_{77.5}$
DUCTILE BRAZING FOIL FOR CAST SUPERALLOYS

BACKGROUND

As taught by U.S. Pat. No. 3,753,794, a ductile foil is produced by conventional techniques by reducing or eliminating elements present in the superalloy composition which make the alloy brittle and unworkable. The ductile superalloy foil which differs in composition from the basic superalloy composition is then boronised and the boron is present as high melting point borides which are the reaction product of boron with the substrate elements.

The disadvantages of the present technique is that the superalloy foil composition differs considerably from the parent metal and therefore, less is the potential for homogeneity at the completed joint as described in U.S. Pat. No. 3,753,794. Also the boronizing process enables the boron to react with the refractory and reactive elements present in the superalloy foil, thereby forming, extremely stable, high melting borides which reduce the rate of diffusion of boron away from the joint during the brazing cycle. U.S. Pat. No. 4,038,041 describes a laminated foil wherein the brazing alloy is a composite interlayer of more than one foil, with amounts and composition of each individual foil being such that the overall composition of the composite is equivalent to the parent superalloy composition. Although this invention provides a complete joint which is of the same composition as the parent superalloy, it has the disadvantage of fabricating the brazing alloy interlayer in multiple foils.

U.S. Pat. No. 3,856,513 discloses a wire product where alloys are represented by the formula TiXj wherein T is a transition metal and X is Al, Sb, Be, B, Ge, C, In, P, Si or Sn. The transition metals include metals from Groups IB, IIIB, VB, VIB, VIIB and VIIIB of the periodic table. The patent also teaches that the alloys contain at least 50 percent amorphous phase. As is apparent from that description, 280 binary alloys are disclosed and an infinite number of ternary, quaternary, etc. alloys. Specific examples are given to a Pd$_{77.5}$Cu$_6$Si$_{16.5}$ alloy and a Ni$_{40}$Pd$_{40}$P$_{20}$ alloy. The patent also discloses ternary alloys of the formula M$_a$Y$_b$Z$_c$ in sheet, ribbon and powder form wherein M is Fe, Ni, Cr, Co or V, Y is P, C or B and Z is Al, Si, Sb, Ge In or Be.

The present invention is a thin ductile foil of the same composition as the parent superalloy and therefore having a greater potential for homogeneity at the completed joint. The boride coating on the superalloy foil allows for faster diffusion of the boron into the parent metal since the borides of nickel, iron and cobalt are less stable than the borides of refractory and reactive elements. Since the present invention overcomes the disadvantages of the prior art since it has the same metallurgical composition as the parent superalloy it is believed that this invention is an advancement in the art.

SUMMARY OF THE INVENTION

A thin brazing foil consisting of a ductile substrate having the composition of a cast superalloy and a coating of nickel, iron or cobalt boride deposited on the surfaces of the substrate. The substrate contains a sufficient amount of an amorphous phase and a microcrystalline, metastable solid solution single phase to render the foil ductile. The thickness of foils range from about 0.0005 to about 0.005 inches.

DETAILED DESCRIPTION OF PREFERRED EMBODIMENTS

For a better understanding of the present invention, together with other and further objects, advantages and capabilities thereof, reference is made to the following disclosure and appended claims in connection with the above description of some of the aspects of the invention.

This invention describes thin foil of cast superalloys which are made ductile by the presence of an amorphous phase and a micro-crystalline, metastable, solid solution, single phase. Cast superalloys are of the composition P$_x$Q$_y$R$_z$ where P is an element selected from the group consisting of iron, nickel, chromium or cobalt or a mixture thereof, Q is a refractory element from the group Mo, W, Ta or a mixture thereof, and R is a reactive element from the group consisting of Al, Ti, Cb or a mixture thereof and x = 65 to 95 atomic percent
 y = 1 to 10 atomic percent
 z = 1 to 18 atomic percent
 where x + y + z = 100

Up to 1 wt percent of the element P can be replaced with elements from the group comprising V, Re and Hf.

The elements B, C and Zr may be present essentially as impurities. The cast superalloys which have a high reactive metal content cannot be processed into thin foil by conventional techniques because of the presence of substantial quantities of embrittling gamma prime phases. In this invention, cast superalloy foil is made ductile by the presence of an amorphous phase and a metastable, micro-crystalline solid solution, single phase. Such a condition is achieved by rapid quenching at cooling rates of about $10^5$° C./sec. to $10^6$° C./sec. The high cooling rate can be achieved through a number of techniques such as melt extraction, melt spin, vapor deposition or sputtering, as described in the processes disclosed in U.S. Pat. Nos. 3,896,203; 3,863,700; 3,881,540 and 3,881,541.

Depending on the cooling rate during the rapid quenching, the resulting structure consists of a combination of an amorphous phase and new phases not available under equilibrium conditions and solid solution with solubility limits extended beyond their equilibrium values, as described by Pol Duwez, R. H. Willens in Transactions of the Metallurgical Society of AIME, Vol. 227, p. 362, April 1963. The amorphous phase is intrinsically ductile because the glassy structure allows for slip in all possible directions. Additional ductility results from the presence of a metastable micro-crystalline, single phase, solid solution which has a large grain-boundary area.

Whereas U.S. Pat. No. 3,753,794 describes addition of a melting point depressant such as boron, through the surface of the foil by a boronizing process, the depth of penetration of the boron being limited so as to have at least 25 percent of a boron-free ductile core, the sole purpose of addition of boron as nickel, iron or cobalt boride to the surface of the foil in this invention is to allow the boron to diffuse away readily during the brazing cycle. If boron is alloyed directly with the superalloy and a ductile foil of appreciable amorphous content could be produced as described in U.S. Pat. No. 3,856,513, the boron would form very stable borides with the refractory and reactive elements in the superalloy and prevent the diffusion of boron into the parent metal during the brazing cycle. Therefore, boron of quantity sufficient to depress the melting point to the required brazing temperature, is added to the surface of the superalloy foil by a low temperature deposition process below the crystallization temperature of the superalloy, such as an electroless deposition of metal boride. A suitable process involves using an amine borane as the reducing agent as disclosed in U.S. Pat. Nos. 3,338,726 and 4,005,988. The overall effect is to form metal boride on the surface of the ductile cast superalloy foil. The electroless plating temperature is at about 70° C. which is below the crystallization temperature of the superalloy foil. The amount of metal boride can range from about 2 to about 25 atomic percent of the total foil composition.

While there has been shown and described what are at present considered the preferred embodiments of the invention, it will be obvious to those skilled in the art that various changes and modifications may be made therein without departing from the scope of the invention as defined by the appended claims.

What is claimed is:

1. A brazing foil consisting essentially of a substrate having the formula $P_x Q_y R_z$ wherein P is an element selected from the group consisting of iron, nickel, chromium, cobalt and mixtures thereof, Q is a refractory element selected from the group consisting of molybdenum, tungsten, tantalum and mixtures thereof, R is a reactive element selected from the group consisting of aluminum, titanium, columbium and mixtures thereof, x is from about 65 to about 95 atomic percent, y is from about 1 to about 10 atomic percent, z is from about 1 to about 18 atomic percent, said substrate containing an effective amount of an amorphous phase and a microcrystalline, metastable single phase to render said substrate ductile and on the external surfaces a coating of nickel, iron or cobalt boride as a melting point depressant, said foil having a thickness of from about 0.0005 to about 0.005 inches.

2. A brazing foil according to claim 1 wherein up to about 1 weight percent of element P is replaced with an element selected from the group consisting of vanadium, rhenium and hafnium.

3. A brazing foil according to claim 1 wherein the quantity of boron added to the surface as metal boride, ranges from about 2 to about 25 atomic percent of the total foil composition.

* * * * *